US008768741B1

(12) United States Patent
Hinton et al.

(10) Patent No.: US 8,768,741 B1
(45) Date of Patent: Jul. 1, 2014

(54) DISPLAYING AN ITEM OF WORK IN A WORKFLOW CONTEXT

(75) Inventors: Tommy L. Hinton, Leawood, KS (US); Jerald T. Chamberlain, Kansas City, KS (US); James Robert Collins, Olathe, KS (US)

(73) Assignee: Cerner Innovation, Inc., Kansas, KS (US)

( * ) Notice: Subject to any disclaimer, the term of this patent is extended or adjusted under 35 U.S.C. 154(b) by 182 days.

(21) Appl. No.: 12/432,504

(22) Filed: Apr. 29, 2009

Related U.S. Application Data

(62) Division of application No. 11/028,263, filed on Jan. 3, 2005, now abandoned.

(51) Int. Cl.
*G06Q 10/00* (2012.01)

(52) U.S. Cl.
USPC .................. 705/7.27; 705/7.13; 705/7.25

(58) Field of Classification Search
USPC .................... 705/8, 7.13, 7.25, 7.27
See application file for complete search history.

(56) References Cited

U.S. PATENT DOCUMENTS

| 5,774,661 | A | * | 6/1998 | Chatterjee et al. | 709/203 |
| 5,809,130 | A | * | 9/1998 | Ayala | 379/266.01 |
| 5,826,239 | A | | 10/1998 | Du | |
| 5,999,911 | A | * | 12/1999 | Berg et al. | 705/7.26 |
| 6,047,261 | A | | 4/2000 | Siefert | |
| 6,225,998 | B1 | * | 5/2001 | Okita et al. | 715/853 |
| 6,349,238 | B1 | * | 2/2002 | Gabbita et al. | 700/101 |
| 6,445,774 | B1 | * | 9/2002 | Kidder et al. | 379/9.03 |
| 6,601,233 | B1 | | 7/2003 | Underwood | |
| 6,720,967 | B1 | * | 4/2004 | Cox et al. | 345/440 |
| 6,895,573 | B2 | * | 5/2005 | Norgaard et al. | 717/100 |
| 6,918,053 | B1 | * | 7/2005 | Thatte et al. | 714/16 |
| 7,221,377 | B1 | * | 5/2007 | Okita et al. | 345/629 |
| 7,302,436 | B2 | | 11/2007 | Qubti et al. | |
| 7,419,469 | B2 | * | 9/2008 | Vacca | 600/437 |
| 2001/0044840 | A1 | | 11/2001 | Carleton | |
| 2002/0046072 | A1 | * | 4/2002 | Arai et al. | 705/8 |
| 2003/0074222 | A1 | * | 4/2003 | Rosow et al. | 705/2 |
| 2003/0090514 | A1 | * | 5/2003 | Cole et al. | 345/744 |
| 2003/0149598 | A1 | | 8/2003 | Santoso et al. | |
| 2004/0078231 | A1 | * | 4/2004 | Wilkes et al. | 705/2 |

(Continued)

OTHER PUBLICATIONS

Non-Final Office Action mailed Jun. 8, 2009 regarding U.S. Appl. No. 11/028,263, filed Jan. 3, 2005, 14 pages.

(Continued)

*Primary Examiner* — Jonathan G Sterrett
*Assistant Examiner* — Stephen S Swartz
(74) *Attorney, Agent, or Firm* — Shook, Hardy & Bacon LLP

(57) ABSTRACT

A user interface for use in, e.g., a healthcare computing environment, for displaying an item of work in a workflow context associated with a particular resource is provided In one embodiment, the user interface includes a first workflow context display area configured to display a current workflow state of the item of work and at least one of a past workflow state and a potential future workflow state of the item of work. The user interface may further include a selectable workflow view indicator, whereby following the selectable workflow view indicator allows a user to navigate to a second workflow context display area configured to display an identity of at least one additional resource associated with the item of work and a status of the item of work as it pertains to the additional resource.

15 Claims, 5 Drawing Sheets

(56) References Cited

U.S. PATENT DOCUMENTS

| | | | |
|---|---|---|---|
| 2004/0254806 A1* | 12/2004 | Schwerin-Wenzel et al. | 705/1 |
| 2004/0260593 A1* | 12/2004 | Abraham-Fuchs et al. | 705/8 |
| 2005/0002515 A1 | 1/2005 | Mewhinney | |
| 2005/0004825 A1* | 1/2005 | Ehrler et al. | 705/8 |
| 2005/0096924 A1 | 5/2005 | Enis et al. | |
| 2005/0097536 A1* | 5/2005 | Bernstein et al. | 717/156 |
| 2005/0215867 A1* | 9/2005 | Grigsby et al. | 600/300 |
| 2005/0257158 A1 | 11/2005 | Lombardo | |
| 2009/0090514 A1 | 4/2009 | Cole et al. | |

OTHER PUBLICATIONS

Final Office Action mailed Jan. 11, 2010 regarding U.S. Appl. No. 11/028,263, filed Jan. 3, 2005, 20 pages.
Non-Final Office Action mailed Jul. 7, 2010 regarding U.S. Appl. No. 12/648,863, 20 pages.
Non-Final Office Action mailed Aug. 17, 2010 regarding U.S. Appl. No. 12/648,874, 15 pages.
Non-Final Office Action mailed Aug. 16, 2011 regarding U.S. Appl. No. 12/648,863, 22 pages.
Final Office Action mailed Dec. 21, 2010 regarding U.S. Appl. No. 12/648,863, 20 pages.
Final Office Action mailed Feb. 28, 2011 regarding U.S. Appl. No. 12/648,874, 14 pages.
Non-Final Office Action mailed Oct. 14, 2011 regarding U.S. Appl. No. 12/648,874 18 pages.
Non-Final Office Action mailed Oct. 14, 2011 regarding U.S. Appl. No. 12/648,874, 18 pages.
Final Office Action mailed Jan. 19, 2012 regarding U.S. Appl. No. 12/648,863, 25 pages.
Non-Final Office Action mailed Jul. 17, 2013 in U.S. Appl. No. 12/648,863; 33 pages.

* cited by examiner

FIG. 2.

| DOE, JOHN | 8 Y M | DOB 11-15-1996 | PCP JANET HEINZ, MD | MRN 128998843 | | NEW: NOTE | ORDER | MESSAGE |

ESCALATED RESULT TO ENDORSE - CULTURE REPORT (POSITIVE)

SUBJECT ESCALATED RESULT TO ENDORSE - CULTURE REPORT (POSITIVE)
RE DOE, JOHN ORIGINAL RECIPIENTS: GEORGE HAMBRECT, MD RESIDENT (PENDING); JANET HEINZ, MD PCP (REVIEWED);
TO NIGEL CROSS, MD SUSAN HICKS, RN CHARGE NURSE (REVIEWED); JUNE KLAUS, RN INFECTIOUS DISEASES (REVIEWED);
ESCALATED TODAY AT 12:00PM CHRIS COLLINS, LPN SCHOOL NURSE (PENDING); DEPARTMENT OF PUBLIC HEALTH (PENDING)

ESCALATION PATH: GEORGE HAMBRECT, MD RESIDENT → NIGEL CROSS, MD ATTENDING → PAUL BLAKE, MD CHIEF OF PEDIATRICS
ESCALATED AFTER 0:30 — 206 — 0:09 REMAINING — 208 — NOT YET ESCALATED — 210
— 216 — ▼ VIEW WORKFLOW — 220 — 221

[ ENDORSE ▼ ] — 212                                                                                         [ SUBMIT ]

CULTURE REPORT (POSITIVE)

CSF REPORT

COLLECTED  05-07-2005 8:20PM        SOURCE  SPINAL FLUID       BODY SITE  LUMBAR

| RESULTS | GRAM STAIN | NO BACTERIA SEEN<br>4+ WBC | | RESISTANCE<br>& SUSCEPTIBILITY | PENDING |
|---|---|---|---|---|---|
| | ANTIGEN TEST | POSITIVE CROSS REACTIVITY BETWEEN H.FLU AND<br>NEISSERIA, NEGATIVE FOR STREP PNEUMONIA | | PROTEIN | 105 MCG/ML |
| | CULTURE | + NEISSERIA<br>- HAEMOPHILUS INFLUENZAE<br>- STREPTOCOCCUS | | GLUCOSE | 32 MCG/DL |

TREATMENT OPTIONS

THE PRESENCE OF GRAM NEGATIVE BACTERIA MAY NECESSITATE A CHANGE IN ANTIBIOTIC COVERAGE.

RELATED RESULTS   SERUM CREATINE   1.5 MG/DL                                    SERUM BUN   14 MG/DL

| CURRENT<br>MEDICATIONS | ORDER | | LAST ACTION ▼ | STATUS | ORDER ACTION |
|---|---|---|---|---|---|
| | VANCOMYCIN: | 480MG (15NG/KG) IV Q8HOURS | 05-07-2005 8:20PM | ACTIVE | DISCONTINUE ▶ |
| | CEFTRIAXONE: | 1590MG (50MG/KG) IV Q12HOURS | 05-07-2005 8:20PM | ACTIVE | NONE ▶ |

[ PIN ]   [ SIGN ]

— 200
— 202
— 204
— 205

DISPLAYING AN ITEM OF WORK IN A WORKFLOW CONTEXT

CROSS-REFERENCE TO RELATED APPLICATIONS

This application is a divisional of, and claims priority from, U.S. patent application Ser. No. 11/028,263, filed Jan. 3, 2005. U.S. patent application Ser. No. 11/028,263 is incorporated herein by reference in its entirety.

STATEMENT REGARDING FEDERALLY SPONSORED RESEARCH OR DEVELOPMENT

Not Applicable.

TECHNICAL FIELD

The present invention relates to computing environments. More particularly, embodiments of the present invention relate to a user interface for use in, e.g., a healthcare computing environment, for displaying an item of work in a workflow context associated with a particular resource or list of available resources. Further embodiments of the present invention relate to methods in, for instance, a healthcare computing environment, for displaying at least one item of work in a workflow context associated with a particular resource or list of available resources.

BACKGROUND OF THE INVENTION

In modern healthcare computing environments, applications exist which are designed to facilitate the assignment and completion of items of work. Items of work may include, by way of example only, a process, an order, a step within an order process, or the like. Existing applications generally have lists of work items from which a resource (that is, any individual, group of individuals, or machine capable of performing an action) selects or is presented with one or more items of work for which they are to take some action. Once an item of work has been completed, it may be routed to another list of work items or work queue for a different action to be performed by the same resource or a different resource.

In these existing applications, it is difficult for a particular resource to identify the workflow path that a work item has taken before it gets to them for action. It is also difficult for a particular resource to determine what actions are expected to be completed and by what resource. Oftentimes, items of work sit idle because a resource is unaware of how long an item of work has taken to get to them, what actions have already been performed, and/or that work items even exist. For instance, when a physician writes a stat order, the physician often does not know what resource or resources are acting upon that order and in what time frame action may be being taken. It is also unlikely that a resource will know what further actions are still needed in order for the process (i.e., the workflow) to be considered complete.

Accordingly, a user interface which provides authorized resources the ability to review past actions related to an item of work, in addition to an identity of the resource(s) that completed those past actions and the length of time that passed prior to the item of work reaching the authorized resource, would be desirable. Additionally, a user interface which provides authorized resources the ability to identify any further additional actions that are required (and by what resource(s)) in order for a workflow process to be considered complete would be advantageous.

BRIEF SUMMARY OF THE INVENTION

Embodiments of the present invention provide a user interface for use in, e.g., a healthcare computing environment, for displaying an item of work in a workflow context associated with a particular resource. In one embodiment, the user interface includes a first workflow context display area configured to display a current workflow state of the item of work and at least one of a past workflow state and a potential future workflow state of the item of work. The user interface may further include a selectable workflow view indicator, whereby following the selectable workflow view indicator allows a user to navigate to a second workflow context display area configured to display an identity of at least one additional resource associated with the item of work and a status of the item of work as it pertains to the additional resource.

In further embodiments, the user interface may include a work item display area configured to display one or more items of work to be acted upon by a first resource, wherein at least one of the one or more items of work comprises a selectable work item indicator. In one embodiment, following a selected one of the selectable work item indicators allows a user to navigate to a workflow context display area configured to display a current workflow state of the item of work associated with the selected one of the selectable work item indicators and at least one of a past workflow state and a potential future workflow state of the item of work associated with the selected one of the selectable work item indicators. In another embodiment, following a selected one of the selectable work item indicators allows a user to navigate to a workflow context display area configured to display (1) a current workflow state of the item of work associated with the selected one of the selectable work item indicators, (2) at least one of a past workflow state and a potential future workflow state of the item of work associated with the selected one of the selectable work item indicators, (3) an identity of at least one additional resource associated with the item of work associated with the selected one of the selectable work item indicators, and (4) a status of the item of work associated with the selected one of the selectable work item indicators as it pertains to the at least one additional resource.

Additional embodiments of the present invention provide methods in, for instance, a healthcare computing environment, for displaying at least one item of work in a workflow context associated with a particular resource. In one embodiment, the method includes receiving an item of work, determining a workflow for the item of work, and displaying the item of work in the context of the determined workflow as it pertains to the particular resource.

BRIEF DESCRIPTION OF THE SEVERAL VIEWS OF THE DRAWING

The present invention is described in detail below with reference to the attached drawing figures, wherein:

FIG. 2 is an illustrative screen display of an exemplary user interface having a first workflow context display area and a selectable workflow view indicator in accordance with an embodiment of the present invention;

DETAILED DESCRIPTION OF THE INVENTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to a user interface for use in, e.g., a healthcare computing environment, for displaying an item of work in a workflow context associated with a particular resource or list of available resources. Further embodiments of the present invention relate to methods in, for instance, a healthcare computing environment, for displaying at least one item of work in a workflow context associated with a particular resource or list of available resources. An exemplary operating environment for the present invention is described below.

Figure 1:
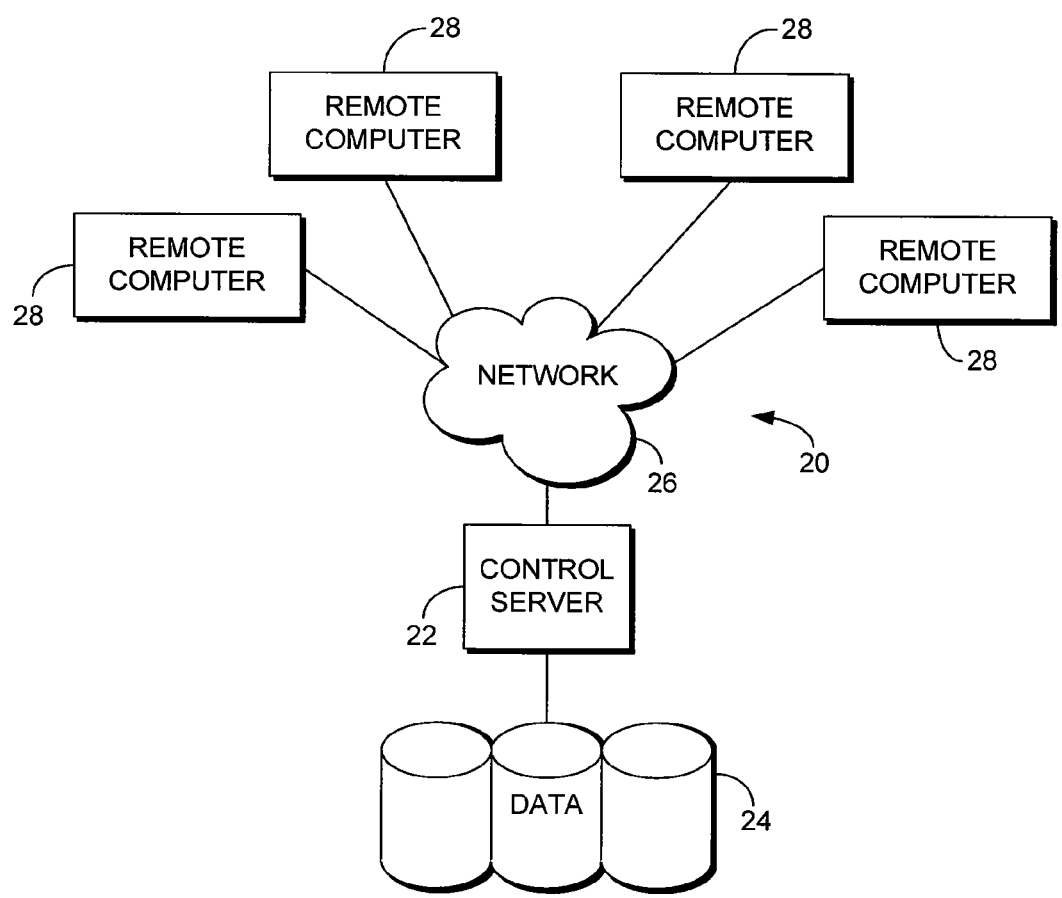
FIG. 1 is a block diagram of an exemplary computing environment suitable for use in implementing the present invention.

Referring to the drawings in general, and initially to FIG. 1 in particular, an exemplary computing system environment, for instance, a medical information computing system, on which the present invention may be implemented is illustrated and designated generally as reference numeral 20. It will be understood and appreciated by those of ordinary skill in the art that the illustrated medical information computing system environment 20 is merely an example of one suitable computing environment and is not intended to suggest any limitation as to the scope of use or functionality of the invention. Neither should the medical information computing system environment 20 be interpreted as having any dependency or requirement relating to any single component or combination of components illustrated therein.

The present invention may be operational with numerous other general purpose or special purpose computing system environments or configurations. Examples of well-known computing systems, environments, and/or configurations that may be suitable for use with the present invention include, by way of example only, personal computers, server computers, hand-held or laptop devices, multiprocessor systems, microprocessor-based systems, set top boxes, programmable consumer electronics, network PCs, minicomputers, mainframe computers, distributed computing environments that include any of the above-mentioned systems or devices, and the like.

The present invention may be described in the general context of computer-executable instructions, such as program modules, being executed by a computer. Generally, program modules include, but are not limited to, routines, programs, objects, components, and data structures that perform particular tasks or implement particular abstract data types. The present invention may also be practiced in distributed computing environments where tasks are performed by remote processing devices that are linked through a communications network. In a distributed computing environment, program modules may be located in local and/or remote computer storage media including, by way of example only, memory storage devices.

With continued reference to FIG. 1, the exemplary medical information computing system environment 20 includes a general purpose computing device in the form of a control server 22. Components of the control server 22 may include, without limitation, a processing unit, internal system memory, and a suitable system bus for coupling various system components, including database cluster 24, with the control server 22. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standards Association (VESA) local bus, and Peripheral Component Interconnect (PCI) bus, also known as Mezzanine bus.

The control server 22 typically includes therein, or has access to, a variety of computer readable media, for instance, database cluster 24. Computer readable media can be any available media that may be accessed by control server 22, and includes volatile and nonvolatile media, as well as removable and nonremovable media. By way of example, and not limitation, computer readable media may include computer storage media and communication media. Computer storage media may include, without limitation, volatile and nonvolatile media, as well as removable and nonremovable media implemented in any method or technology for storage of information, such as computer readable instructions, data structures, program modules, or other data. In this regard, computer storage media may include, but is not limited to, RAM, ROM, EEPROM, flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by control server 22. Communication media typically embodies computer readable instructions, data structures, program modules, or other data in a modulated data signal, such as a carrier wave or other transport mechanism, and may include any information delivery media. As used herein, the term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer readable media.

The computer storage media discussed above and illustrated in FIG. 1, including database cluster 24, provide storage of computer readable instructions, data structures, program modules, and other data for control server 22.

The control server 22 may operate in a computer network 26 using logical connections to one or more remote computers 28. Remote computers 28 may be located at a variety of locations in a medical environment, for example, but not limited to, clinical laboratories, hospitals and other inpatient settings, ambulatory settings, medical billing and financial offices, hospital administration settings, home health care environments, and clinicians' offices. Clinicians may include, but are not limited to, a treating physician or physicians, specialists such as surgeons, radiologists and cardiologists, emergency medical technicians, physicians' assistants, nurse practitioners, nurses, nurses' aides, pharmacists, dieticians, microbiologists, and the like. Remote computers 28 may also be physically located in non-traditional medical care environments so that the entire health care community may be capable of integration on the network. Remote computers 28 may be personal computers, servers, routers, network PCs, peer devices, other common network nodes, or the like, and may include some or all of the elements described above in relation to the control server 22.

Exemplary computer networks 26 may include, without limitation, local area networks (LANs) and/or wide area networks (WANs). Such networking environments are commonplace in offices, enterprise-wide computer networks, intranets, and the Internet. When utilized in a WAN networking environment, the control server 22 may include a modem or other means for establishing communications over the WAN, such as the Internet. In a networked environment, program modules or portions thereof may be stored in the control server 22, in the database cluster 24, or on any of the remote computers 28. For example, and not by way of limitation, various application programs may reside on the memory associated with any one or more of the remote computers 28. It will be appreciated by those of ordinary skill in the art that the network connections shown are exemplary and other means of establishing a communications link between the computers (e.g., control server 22 and remote computers 28) may be utilized.

In operation, a user may enter commands and information into the control server 22 or convey the commands and information to the control server 22 via one or more of the remote computers 28 through input devices, such as a keyboard, a pointing device (commonly referred to as a mouse), a trackball, or a touch pad. Other input devices may include, without limitation, microphones, satellite dishes, scanners, or the like. The control server 22 and/or remote computers 28 may include other peripheral output devices, such as speakers and a printer.

Although many other internal components of the control server 22 and the remote computers 28 are not shown, those of ordinary skill in the art will appreciate that such components and their interconnection are well known. Accordingly, additional details concerning the internal construction of the control server 22 and the remote computers 28 are not further disclosed herein.

As previously mentioned, embodiments of the present invention relate to a user interface for displaying an item of work in a workflow context associated with a particular resource or list of available resources. The terms "item of work", "work item", "instance of work", and "work instance" are used interchangeably herein and refer to any item requiring action by one or more resources. An item of work may have varying levels of detail ranging from a process to an order to a step within an order process, or the like. As used herein the term "resource" refers to any individual (e.g., a clinician), group of individuals (for instance, a practice group), or machine (e.g., a monitoring device or computer system) capable of performing an action. Additionally, the term "workflow", as used herein, refers to the automation of a business process during which documents, information, or tasks are passed from one resource to another for action, according to a set of defined procedural rules. The concept of workflow is known and understood by those of ordinary skill in the art and, accordingly, is not further described herein. By way of example only, the user interface may be used in a healthcare computing environment for displaying an item of work in a workflow context associated with a particular clinician's assigned daily actions.

Items of work may be generated automatically upon receipt of information requiring action by one or more resources or may be manually created by an authorized user. For instance, contemplate a scenario wherein a test result is received which indicates that a potentially life-threatening condition exists for a particular patient. Upon receipt of the test result, a plurality of work items are likely to be generated and/or created notifying one or more resources that action is needed and the appropriate course of action in view of the received result is to be determined.

Each item of work generated is resource-specific, that is, specific to the particular resource for which the item of work is created. For example, in the above-described scenario wherein it is indicated that a potentially life-threatening condition exists for a particular patient based upon a test result, an item of work may be generated for a physician to evaluate whether or not administration of a medication is to be ordered and another item of work may be generated for the patient's primary care physician to review the test results for awareness of the patient's condition. As such, the user interface described herein displays the work item not only in the appropriate workflow context, as more fully described below, but also in the context of a particular resource, for instance, a resource accessing the user interface.

Figure 5:
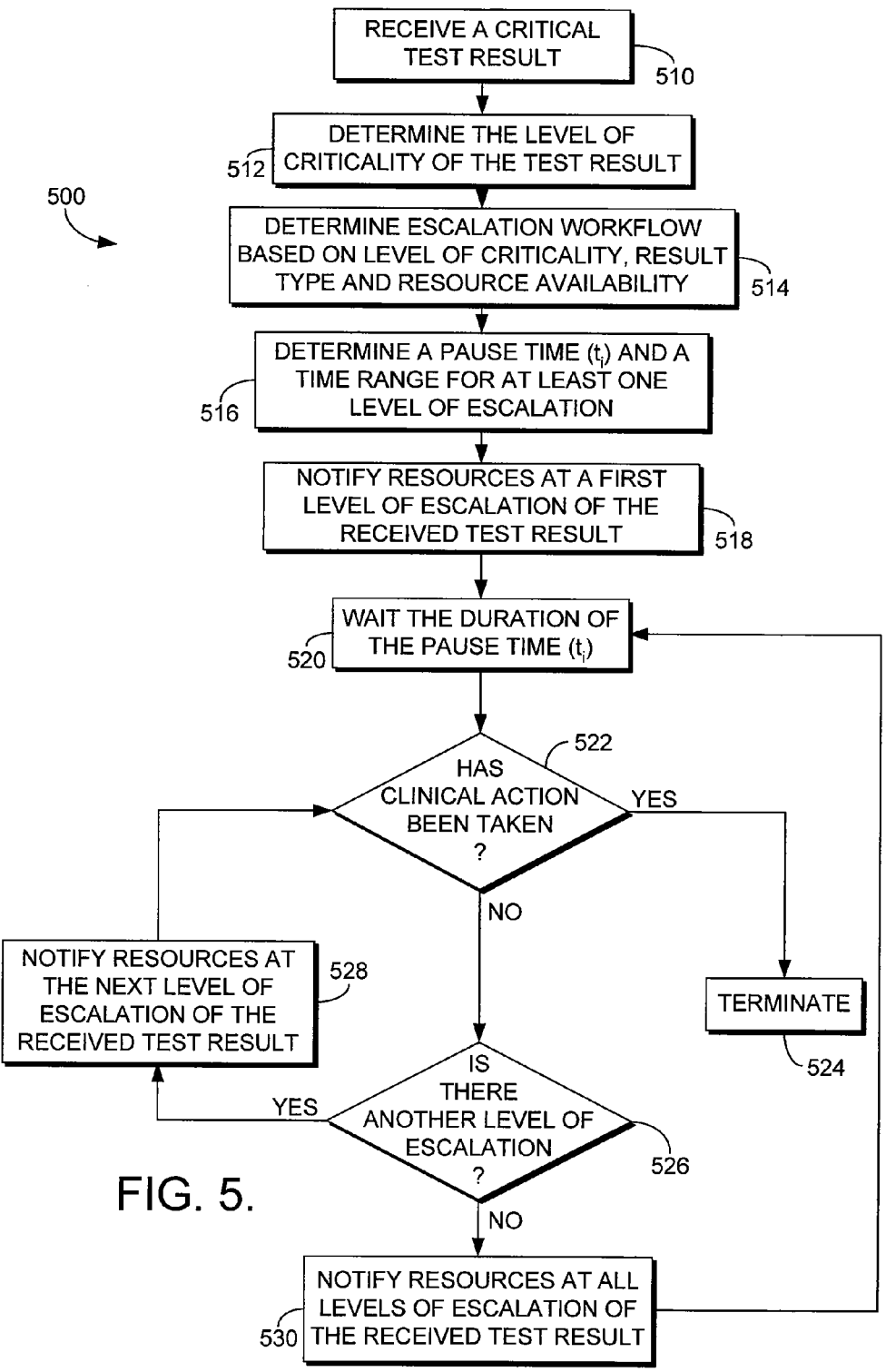
FIG. 5 is a flow chart representative of a exemplary computer program for displaying an escalation workflow context in accordance with an embodiment of the present invention.

The user interface described herein includes a workflow context display area configured to display a current workflow state of the item of work and at least one of a past workflow state and a potential future workflow state of the item of work. In this way, the item of work is displayed in the appropriate workflow context associated therewith. A past workflow state may indicate a prior action or inaction by a resource that caused the work item in question to be generated or created. For instance, in the above-described scenario, if the work item generated/created for the physician is completed upon the physician's ordering of a particular medication, another work item may be created for a nurse to begin administration of the ordered medication. Accordingly, the workflow context for the nurse's item of work may show a past workflow state indicating the action taken by the physician. Alternatively, if, in the above-described scenario, the physician does not take action on the work item within a predefined period of time (e.g., thirty minutes), the physician's item of work may be automatically escalated by the system, resulting in a new, parallel work item being created for the physician's supervisor indicating that action still needs to be taken with regard to the received test result. (Note that in the currently described embodiment, a new work item may be generated for the physician as well, the two work items existing in parallel until action it taken on at least one of them, as more fully described below.) In this case, the workflow context for the supervisor's item of work may show a past workflow state indicating the inaction by the physician. This type of workflow escalation is more fully described below with reference to FIG. 5.

A future workflow state indicates a potential work item that may be generated/created if action is taken or not taken with regard to the work item in question. Future workflow states are considered "potential" as they are dependent, at least in part, on the action or inaction of the resource to which the item of work in question pertains. For instance, in the above-described scenario, if the work item generated/created for the physician is completed upon the physician's ordering of a particular medication, another work item is likely to be created for a nurse to begin administration of the ordered medication. Thus, prior to the physician's action on the work item in question, the workflow context for the physician's item of work may show a potential future workflow state indicating the nurse's potential future action. This type of workflow context may be considered a "standard" workflow context as it is determined according to standard procedural rules that represent the best practices for the treatment of a given condition.

However, if the work item generated/created for the physician is not completed in a timely fashion, another work item is likely to be created for the physician's supervisor to take action with regard to the received test result. As such, an alternative workflow for the physician's item of work may show a potential future workflow state indicating the supervisor's potential future action. This type of workflow context may be considered an "exception" workflow context as it is determined based upon at least one exception to the standard procedural rules. Exception workflow contexts are defined to capture unexpected events and direct the actions required based upon the exception. The type of exception workflow described with regard to the above-described scenario may be considered an "escalation" workflow, and is more fully described below with reference to FIG. 5.

A determination of which future workflow state(s), and thus of the workflow context, displayed in the workflow context display area described herein is made by the system in accordance with a set of predefined procedural rules, as will be understood and appreciated by those of ordinary skill in the art. Thus, the workflow context may be determined by a number of factors including, by way of example only, a received test result, the criticality of a received test result, a prescribed treatment plan, an action taken by a resource associated with the event that prompted generation/creation of the item of work in question, an action not taken by a resource associated with the item of work in question, and an availability of one or more resources who may be associated with the item of work in question. For instance, by way of example only, if action has been taken with respect to the work items in all past workflow states in the workflow, the potential future workflow state(s), and thus the workflow context, may be based on an assumption that the item of work related to the current workflow state will also be acted upon. However, if no action has been taken with respect to the work item of a past workflow state in the workflow, the potential future workflow state(s), and thus the workflow context, may be based on an assumption that the item of work related to the current workflow state will similarly not be acted upon.

In one embodiment, the workflow context display area may be further configured to display a status indicator in association with at least one of the current workflow state, the past workflow state(s), and the potential future workflow state(s) within the workflow context. The status indicator may be indicative of action taken or not taken with regard to a past workflow state, of time passed since generation of the work item (or time remaining to act upon the work item) with regard to a current workflow state, or of the fact that a work item has yet to be created with regard to a potential future workflow state.

In one embodiment, the user interface described herein may further include an information display area configured to display detailed information regarding the event or events that caused the item of work in question to be generated. For instance, in the above-described scenario, detailed information regarding the test result which prompted the generation of the physician's item of work may be displayed in the information display area.

The user interface described herein may further include a summary display area configured to display a summary of information pertaining to the work item in question, if desired. The summary display area may include any information pertaining to the item of work. By way of example only, such information may include a subject line indicating the action required by the resource/user, an identity of the patient for whom the item of work was created, an identity of the user, and a list of additional resources for which items of work were created in association with the event that prompted generation/creation of the item of work in question.

In one embodiment, the user interface of the present invention may further include a selectable workflow view indicator, selection of which may allow a user to navigate to another workflow context display area, as more fully described below.

With reference to FIG. 2, an exemplary user interface in accordance with an embodiment of the present invention is shown and designated generally as reference numeral 200. The user interface 200 includes a summary display area 202, a workflow context display area 204, and an information display area 205 configured to display detailed information regarding the event or events that caused the item of work in question to be generated. For instance, in the illustrated scenario, a test for gram negative bacteria has come back positive for patient John Doe. The presence of gram negative bacteria can be a life-threatening situation and may necessitate a change in antibiotic coverage. Accordingly, upon receiving the test result, a plurality of work items were likely created, one of which required a physician to endorse the result and determine whether or not a change in Mr. Doe's antibiotic coverage was needed. As such, detailed information concerning the gram negative bacteria test result, any related test results, and medications currently being administered to Mr. Doe are displayed in the information display area 205.

The summary display area 202 of FIG. 2 is configured to display a summary of information pertaining to the event that prompted generation/creation of the item of work. In the summary display area 202, the information displayed includes a subject line indicating the action required by the user, an identity of the patient, an identity of the user, and a list of the resources for which items of work were initially created upon receipt of the test result. Also shown in association with each resource for which an item of work was initially created is a status of the item of work associated with that resource (i.e., pending or reviewed). It will be understood and appreciated by those of ordinary skill in the art that the information displayed in the summary display area 202 of FIG. 2 is exemplary only and not intended to limit the scope of the present invention in any way. Any information pertaining to the item of work may be displayed and is intended to be within the scope of the present invention.

The workflow context display area 204 may be configured to display a current workflow state of the item of work in question, a past workflow state of the item of work in question, and a potential future workflow state of the item of work in question. The workflow context display area 204 is further configured to display a status indicator in association with each of the past, current, and future workflow states. A status indicator 208 indicates that the current workflow state of the item of work in question is such that the user, Nigel Cross, MD, has nine minutes remaining to endorse or otherwise take action on the received test results. Shown in association with the identify of Nigel Cross, MD is an indicator 220 having a shaded figure surrounded by a thin-lined box. This is intended to illustrate that the resource is an individual and that no action has been taken by this individual with respect to the relevant item of work.

A status indicator 206 indicates that the past workflow state of the item of work in question is such that another resource, George Hambrect, MD, was assigned to endorse or otherwise take action on the received test result and failed to act within thirty minutes, at which time the work item assigned to Dr. Hambrect was automatically escalated, resulting in a new, parallel work item being generated for Dr. Cross. (The concept of workflow escalation is more fully described below.) Shown in association with the resource identity of George Hambrect, MD is an indicator 216 having a non-shaded figure surrounded by a shaded box. This is intended to illustrate that the required action associated with the corresponding work item was not completed in a timely fashion and, accordingly, an escalated work item was created as a result.

A status indicator 210 indicates that a potential future workflow state of the item of work in question is such that if Dr. Cross fails to take action on the item of work in question within the remaining nine minute time frame, the work item in question will be automatically escalated, resulting in a new, parallel work item generated for Paul Blake, MD. Simultaneously, the uncompleted work item will be forwarded to an audit log indicating its incomplete status and a new work item generated for Dr. Cross as well. In this way, after escalation, a work item exists in parallel for both resources and required action by either resource will remove both work items from their respective work item lists. That is, action by Dr. Cross on the newly generated, escalated work item will remove the parallel work item from Dr. Blake's list of work items requiring action and vice versa. It will be understood and appreciated by those of ordinary skill in the art, however, that in embodiments contemplated by the present invention the system could escalate a single work item, if desired.

Shown in association with the identity of Paul Blake, MD is an indicator 221 having a non-shaded figure surrounded by a thin-lined box. This is intended to illustrate that the resource is an individual and that no work items have been generated or created for this individual with respect to the relevant item of work.

It will be understood and appreciated by those of ordinary skill in the art that the illustrated indicators 216, 220, 221 are shown by way of example only and are not intended to limit the scope of the present invention in any way.

As previously mentioned, the workflow context may be determined by a number of factors including, by way of example only, an availability of one or more resources associated with an item of work. In the currently described embodiment, the user interface of the present invention displays information in real-time. Thus, a resource associated with an item of work for a current or future workflow state may vary over time based upon, for example, the clinicians and other personnel who are on the clock at the time the user interface is being accessed.

The user interface 200 of FIG. 2 further includes a selectable workflow view indicator 212 selection of which allows a user to navigate to the workflow context display area illustrated in FIG. 3, as more fully described below.

As previously described, the user interface of the present invention may include a selectable workflow view indicator, selection of which allows a user to navigate to a second workflow context display area. The second workflow context display area may be configured to display additional information regarding the item of work in question. By way of example only, the second workflow context display area may be configured to display an identity of at least one additional resource for which an item of work was generated based upon the event that prompted generation of the item of work in question and a status of that item of work as it pertains to the additional resource.

For instance, as previously described with regard to the scenario wherein it is indicated that a potentially life-threatening condition exists for a particular patient based upon a test result, it was noted that an item of work may be generated for a physician to evaluate whether or not administration of a medication is to be ordered and another item of work may be generated for the patient's primary care physician to review the test results for awareness of the patient's condition. In this example, the workflow context display area (e.g., workflow context display area 204 of FIG. 2) does not indicate the action required by, nor the action taken by, the patient's primary care physician. While the summary display area may indicate that a work item was generated for the patient's primary care physician based upon the event that prompted generation of the item of work in question, the user may desire to view additional information regarding the action taken (or not taken) and whether the action (or inaction) prompted any additional work items to be generated/created. Such information may, accordingly, be displayed in the second workflow context display area.

Figure 3:
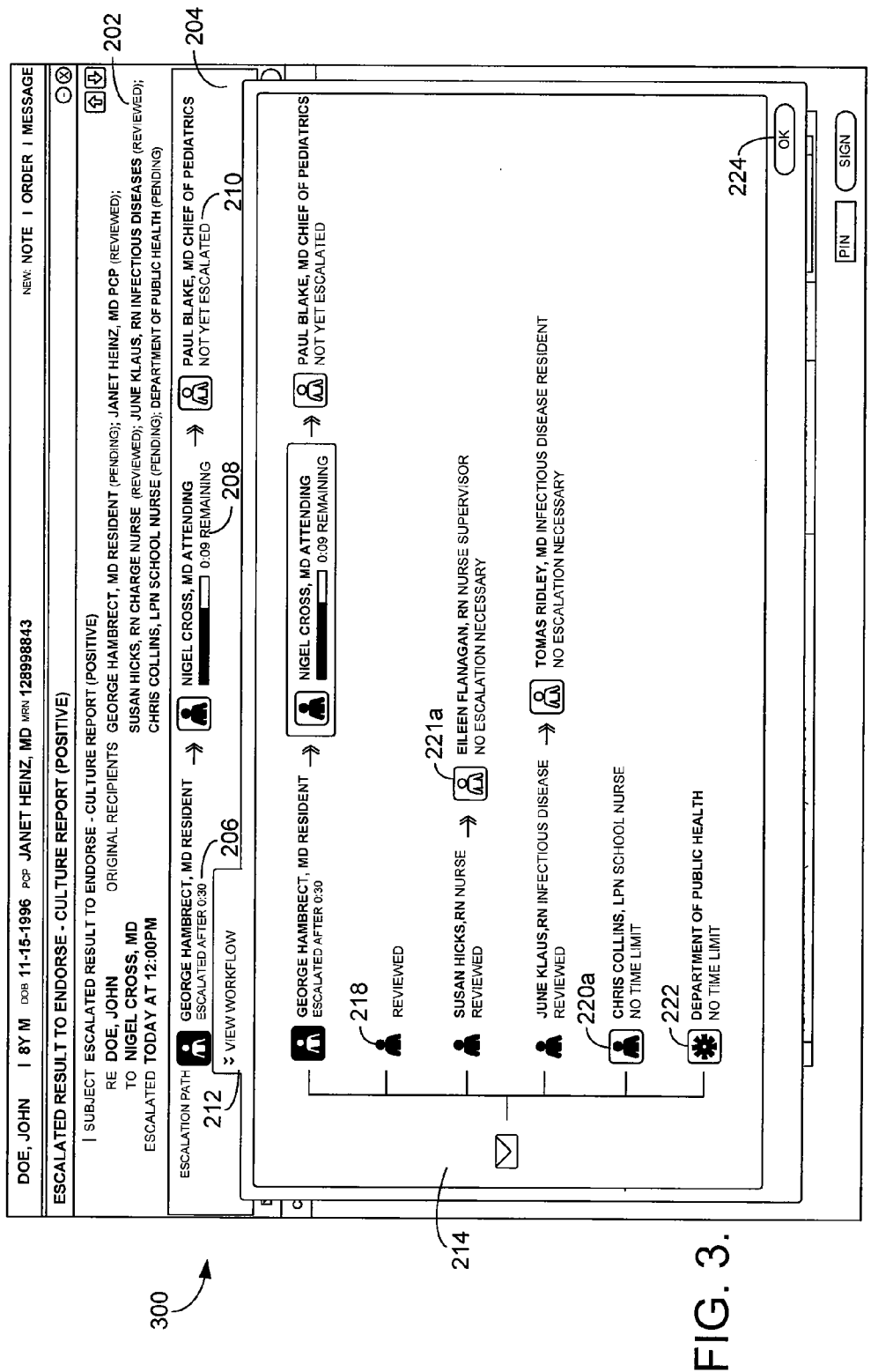
FIG. 3 is an illustrative screen display of an exemplary user interface having a second workflow context display area accessible by following the selectable workflow view indicator of FIG. 2.

With reference to FIG. 3, a user interface having a second workflow context display area 214 is illustrated and designated generally as reference numeral 300. The user interface 300 is accessible upon selection of the workflow view indicator 212 of FIG. 2 (also shown in FIG. 3) and is configured to display the information shown in the workflow context display area (workflow context display area 204 of FIG. 2), as well as an identity of any additional resources for whom items of work were generated based upon the event that prompted generation of the item of work in question and a status of those items of work as they pertain to the additional resources.

For instance, the second workflow context display area 214 includes the information shown in the workflow context display area 204 of FIG. 2, as well as an indication that work items were generated for Janet Heinz, MD, Susan Hicks, RN, June Klaus, RN, Chris Collins, LPN and the Department of Public Health based upon the event which prompted generation of the item of work in question (i.e., the endorsement of the gram negative bacteria test result).

The second workflow context display area 214 further includes an indication that Janet Heinz, MD, Susan Hicks, RN, and June Klaus, RN reviewed the test result. Shown in association with the resource identity and status of these three resources is an indicator 218 having a shaded figure. This is intended to illustrate that the required action associated with the corresponding work item has been completed.

Note that with regard to Susan Hicks, RN and June Klaus, RN, a potential future workflow state is indicated as involving Eileen Flanagan, RN and Tomas Ridley, MD, respectively. The status indicator for these two resources indicates that no escalation was necessary. This is because the necessary action was completed before a work item was created for these two resources. Shown in association with the identity of these resources associated with potential future workflow states is an indicator 221a having a non-shaded figure surrounded by a thin-lined box similar to indicator 221 of FIG. 2. This is intended to illustrate that the resources are individuals and that no work items have been generated or created for these individuals with respect to the relevant items of work.

The second workflow display area 214 also includes an indication that Chris Collins has no time limit in which to act upon the relevant generated work item. Shown in association with the identify of Chris Collins, as well as the status indicator of "no time limit", is an indicator 220a having a shaded figure surrounded by a thin-lined box similar to indicator 220 of FIG. 2. This is intended to illustrate that the resource is an individual and that no action has been taken by this individual with respect to the relevant item of work.

The second workflow display area 214 further includes an indication that the Department of Public Health has no time limit in which to act upon the relevant generated work item. Shown in association with the identity of the Department of Public Health, as well as the status indicator of "no time limit", is an indicator 222 having a shaded star-like image surrounded by a thin-lined box. This is intended to illustrate that the resource is a group and that no action has been taken by the group with respect to the relevant item of work.

It will be understood and appreciated by those of ordinary skill in the art that the illustrated indicators 218, 220a, 221a, 222 are shown by way of example only and are not intended to limit the scope of the present invention in any way. It will be further understood that while the embodiments described herein contemplate separate and distinct user interfaces for the first and second workflow context display areas, the areas could be unified and shown in a common display, if desired. All such variations are contemplated to be within the scope hereof.

In one embodiment, the second workflow context display area 214 may be altered by an authorized user thus changing, for example, a resource assigned to an item of work or a time frame a resource has to respond to an item of work. As such, an authorized user may alter the workflow shown in the second workflow context display area 214, if desired.

The second workflow context display area 214 also includes a completion indicator 224, selection of which allows the user to return to the user interface 200 of FIG. 2.

In another embodiment of the present invention, the workflow context of a particular item of work may be accessed by a user/resource from a work item display area configured to display one or more items of work to be acted upon by the resource. By way of example only, the work item display area of the present invention may list a plurality of work items, each of which requires action by the resource to whom they pertain. If desired, at least one of the items of work displayed in the work item display area is a selectable work item indicator, selection of which may allow a user to navigate to a workflow context display area configured to display a current workflow state of the item of work associated with the selected selectable work item indicator and at least one of a past workflow state and a potential future workflow state of the item of work associated with the selected selectable work item indicator. By way of example only, the displayed workflow context display area may be similar to workflow context display area 204 of FIG. 2.

If desired, the user interface of this embodiment of the present invention may further include a summary display area configured to display a summary of information pertaining to the item of work associated with the selected selectable work item indicator. By way of example only, the summary display area may be similar to the summary display area 202 of FIG. 2 and may include information as described with relation thereto.

Additionally, if desired, the user interface of this embodiment of the present invention may further include a selectable workflow view indicator, selection of which allows a user to navigate to a second workflow context display area associated with the selected selectable work item indicator. By way of example only, the selectable workflow view indicator may be similar to the selectable workflow view indicator 212 of FIG. 2 and the second workflow context display area may be similar to the second workflow display area 214 of FIG. 3.

In another embodiment of the present invention, selection of a selectable work item indicator may allow a user to navigate directly to a workflow context display area similar to the second workflow display area 214 of FIG. 3.

Figure 4:
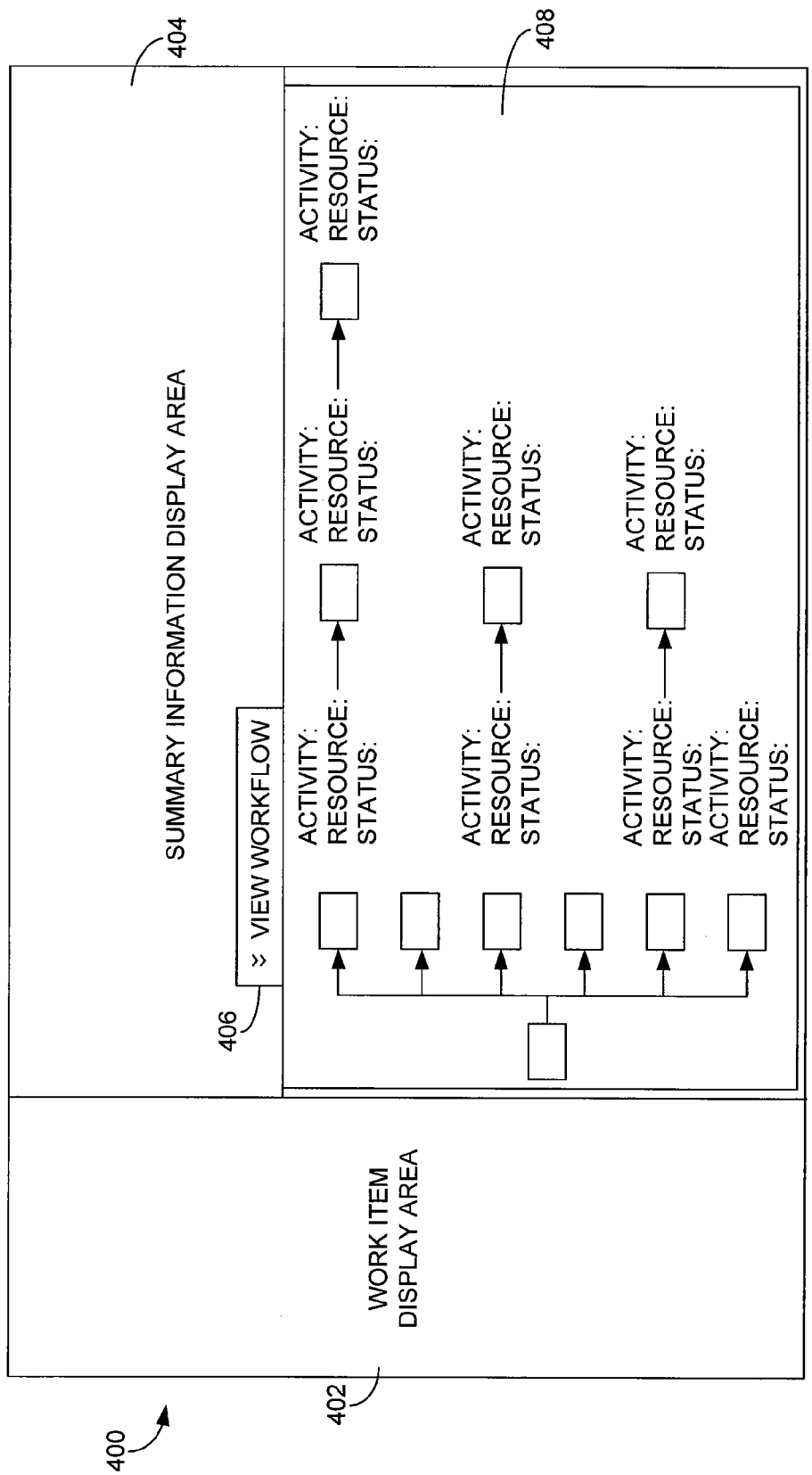
FIG. 4 is an illustrative screen display of an exemplary user interface having a work item display area, a summary display area, and a workflow context display area in accordance with an embodiment of the present invention.

With reference to FIG. 4, a user interface in accordance with yet another embodiment of the present invention is illustrated and designated generally as reference numeral 400. The user interface 400 includes a work item display area 402 configured to display one or more work items, each of which requires action by the resource to whom it pertains. If desired, at least one of the items of work displayed in the work item display area may be a selectable work item indicator, selection of which may allow a user to navigate to a workflow context display area similar to the workflow context display area 204 of FIG. 2 or, if desired, to a workflow context display area similar to the workflow context display area 214 of FIG. 3. In the illustrated embodiment, a workflow context display area 408 is shown which is similar to the workflow context display area 214 of FIG. 3.

The user interface 400 of FIG. 4 further includes a summary display area 404 configured to display a summary of information pertaining to the item of work associated with the selected selectable work item indicator. Though shown without detail in FIG. 4, the summary display area 404 may be similar to the summary display area 202 of FIG. 2 and may include information as described with relation thereto, if desired.

The user interface 400 of FIG. 4 further includes a selectable workflow view indicator 406 selection of which allows a user to navigate to the workflow context display area 408, if desired.

Note that in the illustrated embodiment, each of the work item display area 402, the summary information display area 404 and the workflow context display area 408 are shown on a single user interface. It will be understood and appreciated by those of ordinary skill in the art that this configuration is shown by way of example only and that the work item display area 402 the summary information display area 404 and/or the workflow context display area 408 may be displayed independently of one another, if desired.

As previously mentioned, one potential exception workflow which may be utilized in association with embodiments of the user interface of present invention is an escalation workflow. An exemplary escalation workflow is illustrated in the flow diagram 500 of FIG. 5. Initially, as shown at block 510, a critical test result is received. Subsequently, the level of criticality of the test result is determined. This is shown at block 512. The level of criticality is determined based upon a rules engine and a knowledge base taking into account such factors as, by way of example only, the type of test result, the resources associated with the patient for whom the test was ordered, the identity of the ordering physician, and the like.

Subsequently, an escalation workflow is determined based upon, at least in part, the level of criticality of the test result, the result type, and resource availability. This is shown at block 514. Subsequently or simultaneously, a pause time ($t_i$) and a time range for at least one level of escalation is determined, as shown at block 516. By way of example only, contemplate a scenario wherein the test result indicates a life-threatening condition. In this scenario, the pause time and the time range for each level of escalation may be relatively short (e.g., ten minutes). However, if the test result indicates only a mildly critical condition, the pause time and the time range for each level of escalation may be considerably longer (e.g., one hour or one day).

Subsequently, as indicated at block 518, the resources at the first level of escalation are notified of the test result and the work items generated for them with respect thereto. Next, the duration of the pause time is waited, as indicated at block 520, and it is determined if clinical action has been taken. This is shown at block 522. If clinical action has been taken the action is terminated, as indicated at block 524. If, however, clinical action has not been taken, it is subsequently determined whether another level of escalation is available. This is shown at block 526. If there is another level of escalation available, the resources at the next level of escalation are notified of the received test result and the work items generated for them with respect thereto, as indicated at block 528. Subsequently, the duration of the time range associated with the level of escalation is waited out, and it is determined whether clinical action has been taken, as shown at block 522. The process then continues to follow through this cycle until no further levels of escalation are available.

Once no further levels of escalation are available, all resources at all levels of escalation are notified of the test result, as shown at block 530. The duration of the pause time is subsequently waited, as indicated at block 520, and the process continues through the indicated cycle until appropriate action is taken by one or more resources at which time action is terminated, as indicated at block 524.

It will be understood and appreciated by those of ordinary skill in the art that the above-described escalation method is described herein by way of example only and is not intended to limit the scope of the present invention in any way.

As can be understood, embodiments of the present invention provide a user interface for use in, e.g., a healthcare computing environment, for displaying an item of work in a workflow context associated with a particular resource. Further embodiments of the present invention relate to methods in, for instance, a healthcare computing environment, for displaying at least one item of work in a workflow context associated with a particular resource.

Embodiments of the present invention provide a resource the ability to graphically review the workflow path that a particular item of work has taken, its current workflow state, and its potential future workflow states. It also provides a resource with the identity of additional resources that have been assigned to various workflow states related to the particular item of work, the resources that completed those work items, the resources that are currently assigned to other work items related to the particular process instance, and the resources that are responsible for potential future actions. Embodiments of the present invention further provide a resource the ability to view the amount of time it took for another resource to act on a particular work item or the amount of time that has elapsed with inaction. Embodiments of the present invention further provide a resource the ability to easily identify any additional activities that are required (and by what resources) in order for the workflow process to be considered complete. Based upon the type of work being performed, this feature can help expedite the completion of the workflow process and create a more efficient and timely process.

Embodiments of the present invention provide a real-time view of work items in process and can be utilized as a motivator to complete critical activities in a timely manner. In this way, embodiments of the present invention can help reduce medical error, improve collaboration, and improve patient safety by making resources aware of time sensitive work items and expedite action on those work items by prioritizing their actions related thereto.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

What is claimed is:

1. A method in a healthcare computing environment for displaying at least one clinical item of work in a workflow context associated with a plurality of resources, the method comprising:

receiving an information requiring an action;

generating, utilizing one or more computing devices, a first resource-specific item of work for a first resource requiring a first action by the first resource, in response to receiving the information requiring the action;

determining, utilizing one or more computing devices, a standard workflow for the information requiring the action, the standard workflow including the plurality of healthcare resources, wherein the standard workflow is determined utilizing standard procedural rules determined, at least in part, according to best practices of a healthcare environment;

displaying the first resource-specific clinical item of work in the workflow context of the determined standard workflow including a first current workflow state of the first resource-specific clinical item of work and at least one of a first past workflow state and a first potential future workflow state of the first resource-specific clinical item of work;

determining, utilizing the one or more computing devices, whether the first action by the first resource has been completed, wherein:

(1) when the action by the first resource has been completed, removing the first resource-specific item of work from the determined workflow;

generating a second resource-specific clinical item of work for a second resource requiring a second action by the second resource;

displaying the second resource specific clinical item of work in the workflow context of the determined standard workflow including a second current workflow state of the second resource-specific clinical item of work and at least one of a second past workflow state and a second potential future workflow state of the second resource-specific clinical item of work; or (2) when the action by the first resource has not been completed, determining that at least one exception clinical event has occurred that affects the first resource-specific clinical item of work, wherein the exception clinical event comprises an inaction by the first resource with respect to the first resource-specific clinical item of work;

generating, utilizing one or more computing devices, an escalated third resource-specific clinical item of work for a third resource requiring a third action by the third resource, in parallel with a fourth resource-specific clinical item of work for the first resource requiring a fourth action by the first resource;

displaying in parallel the escalated third resource-specific clinical item of work in the workflow context of the determined standard workflow including an escalated third current workflow state of the escalated third resource-specific clinical item of work and at least one of an escalated third past workflow state and an escalated third potential future workflow state of the escalated third resource-specific clinical item of work, and the fourth resource-specific clinical item of work in the workflow context of the determined workflow, wherein completion of the third action or the fourth action, removes both the escalated third resource-specific item of work and the fourth resource-specific item of work from the determined standard workflow.

2. The method of claim 1, wherein the displayed standard workflow includes an identity of the first, second, and third resources and a status of the respective resource-specific clinical item of work as it pertains to the first, second, and third resources.

3. The method of claim 1, wherein the displayed standard workflow is capable of being altered by an authorized user.

4. One or more non-transitory computer-storage media having computer-executable instructions embodied thereon that, when executed by a computing device having a processor and memory, cause the computing device to perform a method for displaying, in a healthcare computing environment, at least one clinical item of work in a workflow context associated with a particular resource, the method comprising:
    receiving information requiring an action;
    generating a first resource-specific item of work for the first resource requiring a first action by the first resource, in response to receiving the information requiring the action;
    determining a standard workflow for the information requiring the action, the standard workflow including a plurality of healthcare resources, wherein the standard workflow is determined utilizing standard procedural rules determined, at least in part, according to best practices of a healthcare environment;
    displaying the first resource-specific clinical item of work in the context of the determined standard workflow including a first current workflow state of the first resource-specific clinical item of work and at least one of a first past workflow state and a first potential future workflow state of the first resource-specific clinical item of work;
    determining that at least one exception clinical event has occurred that affects the first resource-specific clinical item of work, wherein determining that at least one exception clinical event has occurred is based at least in part upon the first action or a first inaction of the first resource, wherein when the at least one exception clinical event is based on the first inaction;
    generating an escalated second resource-specific clinical item of work for a second resource requiring a second action by the second resource, in parallel with a third resource-specific clinical item of work for the first resource requiring a third action by the first resource;
    displaying the second resource-specific clinical item of work and the third resource-specific clinical item of work in the context of the determined standard workflow including a second current workflow state of the clinical item of work and at least one of a second past workflow state and a second potential future workflow state of the clinical item of work; and
wherein action taken on either the second resource-specific item of work or the third resource-specific item of work removes both the second resource-specific item of work or the third resource-specific item of work from the determined standard workflow.

5. The non-transitory computer-storage media of claim 4, wherein the displayed standard workflow context includes an identity of the first and second resources and a status of the information requiring the action as it pertains to the plurality of healthcare resources.

6. The non-transitory computer-storage media of claim 4, wherein the standard workflow is capable of being altered by an authorized user.

7. The method of claim 1, wherein the first, second, third and fourth resource-specific items of work are selectable.

8. The non-transitory computer-storage media of claim 4, wherein the first, second, and third resource-specific items of work are selectable.

9. A method in a healthcare computing environment for displaying at least one clinical item of work in a workflow context associated with a plurality of resources comprising resources at a plurality of levels of escalation, the method comprising:
    receiving a test result for a patient;
    determining, utilizing one or more computing processes, a level of criticality of the test result;
    determining, utilizing one or more computing processes, a workflow based on the determined criticality of the test result, wherein the workflow is determined utilizing standard procedural rules determined, at least in part, according to best practices of a healthcare environment;
    generating, utilizing one or more computing processes, a first-resource specific item of work for a first plurality of resources at a first level of escalation requiring a first action;
    notifying, utilizing one or more computing processes, the first plurality of resources of the test result and the required first action;
    allowing the first plurality of resources to complete the first action in a first predetermined amount of time, wherein:
        (1) when the first action has been completed in the allowed predetermined amount of time, the workflow is terminated and displaying the first resource specific item or work in a workflow context of the determined workflow; or
        (2) when the first action has not been completed in the allowed predetermined amount of time, determining if there is a level of escalation, wherein when there is a level of escalation;
            a) generating, the utilizing one or more computing processes, a second resource-specific item of work for a second plurality of resources at a second level of escalation requiring a second action;
            b) generating, the utilizing one or more computing processes, a third resource-specific item of work for the first plurality of resources, requiring a third action, in parallel with the second resource-specific item of work;
            c) notifying, utilizing one or more computing processes, the second plurality of resources of the test result and the required second action, and notifying the first plurality of resources of the required third action; and
            d) displaying the first, second, and third resource-specific items of work for the first and second plurality of resources in a workflow context of the determined workflow;

e) allowing the second plurality of resources and the first plurality of resources to complete the second action in a second predetermined amount of time; and wherein the one or more computing processes are performed by one or more computing devices.

10. The method of claim 9, wherein the determining a workflow based on the determined criticality of the test result comprises determining a number of levels of escalation available for the workflow.

11. The method of claim 10, wherein when a resource-specific item of work requiring an action is generated and the action is not completed within the allowed predetermined amount of time, escalating the workflow until all the number of levels of escalation have been exhausted.

12. The method of claim 9, wherein when the first action has not been completed in the allowed predetermined amount of time and there are no levels of escalation available, notifying the test result to the plurality of resources at the plurality of levels of escalation.

13. The method of claim 9, further generating, utilizing one or more computing processes, a third resource-specific item of work for the first plurality of resources, requiring a third action, in parallel with the second resource-specific item of work, wherein completion of the second action or the third action terminates the workflow.

14. The method of claim 9, wherein when a resource-specific item of work requiring an action is generated and the action is not completed within the allowed predetermined amount of time, escalating the workflow until all the plurality of resources all levels of escalation have been notified.

15. The method of claim 9, wherein determined workflow is capable of being altered by an authorized user.

* * * * *